US012562311B2

(12) United States Patent
Ariizumi et al.

(10) Patent No.: US 12,562,311 B2
(45) Date of Patent: Feb. 24, 2026

(54) DIELECTRIC COMPOSITION, ELECTRONIC DEVICE, AND MULTILAYER ELECTRONIC DEVICE

(71) Applicant: TDK CORPORATION, Tokyo (JP)

(72) Inventors: Takuma Ariizumi, Tokyo (JP); Taku Murakami, Tokyo (JP); Nobuto Morigasaki, Tokyo (JP); Toshihiko Kaneko, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1061 days.

(21) Appl. No.: 17/590,541

(22) Filed: Feb. 1, 2022

(65) Prior Publication Data

US 2022/0254570 A1 Aug. 11, 2022

(30) Foreign Application Priority Data

Feb. 9, 2021 (JP) .................................. 2021-019229

(51) Int. Cl.
*H01G 4/12* (2006.01)
*C04B 35/468* (2006.01)
*H01G 4/30* (2006.01)

(52) U.S. Cl.
CPC ....... *H01G 4/1227* (2013.01); *C04B 35/4682* (2013.01); *H01G 4/30* (2013.01); *C04B 2235/3206* (2013.01); *C04B 2235/3224*

(2013.01); *C04B 2235/3236* (2013.01); *C04B 2235/3262* (2013.01); *C04B 2235/3418* (2013.01); *C04B 2235/768* (2013.01)

(58) Field of Classification Search
CPC .... H01G 4/1227; H01G 4/30; C04B 35/4682; C04B 2235/3206; C04B 2235/3224; C04B 2235/3236
See application file for complete search history.

(56) References Cited

U.S. PATENT DOCUMENTS

2017/0186536 A1 6/2017 Sato et al.

FOREIGN PATENT DOCUMENTS

JP 2017-120856 A 7/2017

*Primary Examiner* — Cameron K Miller
(74) *Attorney, Agent, or Firm* — Oliff PLC

(57) ABSTRACT

A dielectric composition includes a main phase, first segregation phases, and second segregation phases. The main phase includes a main component having a perovskite crystal structure of $ABO_3$ (A is one or more selected from Ba, Sr, and Ca, and B is one or more selected from Ti, Zr, and Hf). The first segregation phases include RE (one or more selected from rare earth elements), A, Si, Ti, and O. The second segregation phases include RE, A, Ti, and O and do not substantially include Si. $0.10 < S2/S1 \leq 1.50$ is satisfied on a cross section of the dielectric composition, where S1 is an area ratio of the first segregation phases, and S2 is an area ratio of the second segregation phases.

6 Claims, 4 Drawing Sheets

DIELECTRIC COMPOSITION, ELECTRONIC DEVICE, AND MULTILAYER ELECTRONIC DEVICE

BACKGROUND OF THE INVENTION

The present invention relates to a dielectric composition, an electronic device, and a multilayer electronic device In accordance with the miniaturization and high density of electronics, there has been a demand for miniaturization, large capacity, and improvement in reliability of electronic devices and multilayer electronic devices used in electronics.

Patent Document 1 discloses an invention relating to a multilayer ceramic electronic component in which dielectric layers include Y—Ti segregation particles in addition to dielectric particles. Since the Y—Ti segregation particles are included within a specific range, it is possible to achieve an increase in the number of layers, a thinning of the dielectric layers themselves, and an improvement in reliability.

However, the Y—Ti segregation particles may hinder the densification of the dielectric composition included in the dielectric layers. Then, it may be difficult to increase the density of the dielectric composition.

Patent Document 1: JP2017120856 (A)

BRIEF SUMMARY OF THE INVENTION

The present invention has been achieved under such circumstances. It is an object of the present invention to provide a dielectric composition or the like having a high density and favorable relative permittivity, specific resistance, and high-temperature load life.

To achieve the above object, a dielectric composition according to the present invention comprises a main phase, first segregation phases, and second segregation phases, wherein the main phase includes a main component having a perovskite crystal structure of $ABO_3$ (A is one or more selected from Ba, Sr, and Ca, and B is one or more selected from Ti, Zr, and Hf), the first segregation phases include RE (one or more selected from rare earth elements), A, Si, Ti, and O, the second segregation phases include RE, A, Ti, and O and do not substantially include Si, and $0.10 < S2/S1 \leq 1.50$ is satisfied on a cross section of the dielectric composition, where S1 is an area ratio of the first segregation phases, and S2 is an area ratio of the second segregation phases.

The dielectric composition may further include M in addition to Si and RE, wherein M may be one or more selected from Mg, Mn, V, and Cr, and an RE content may be 0.90 mol % or more and 3.60 mol % or less in terms of $RE_2O_3$, an M content may be 0.20 mol % or more and 1.00 mol % or less in terms of MO, and a Si content may be 0.60 mol % or more and 1.80 mol % or less in terms of $SiO_2$, with respect to the main component.

An atomic ratio of Ba to Ti in the first segregation phases may be more than 1.00, and an atomic ratio of Ba to Ti in the second segregation phases may be less than 1.00.

$0 < A2/A1 < 1.00$ may be satisfied on a cross section of the dielectric composition, where A1 is an average circle equivalent diameter of the first segregation phases, and A2 is an average circle equivalent diameter of the second segregation phases.

An electronic device according to the present invention comprises the dielectric composition.

A multilayer electronic device according to the present invention comprises dielectric layers and electrode layers alternately stacked, wherein the dielectric layers comprise the dielectric composition.

BRIEF DESCRIPTION OF THE DRAWING(S)

DETAILED DESCRIPTION OF THE INVENTION

<1. Multilayer Ceramic Capacitor>

1.1 Overall Configuration of Multilayer Ceramic Capacitor

Figure 1A:
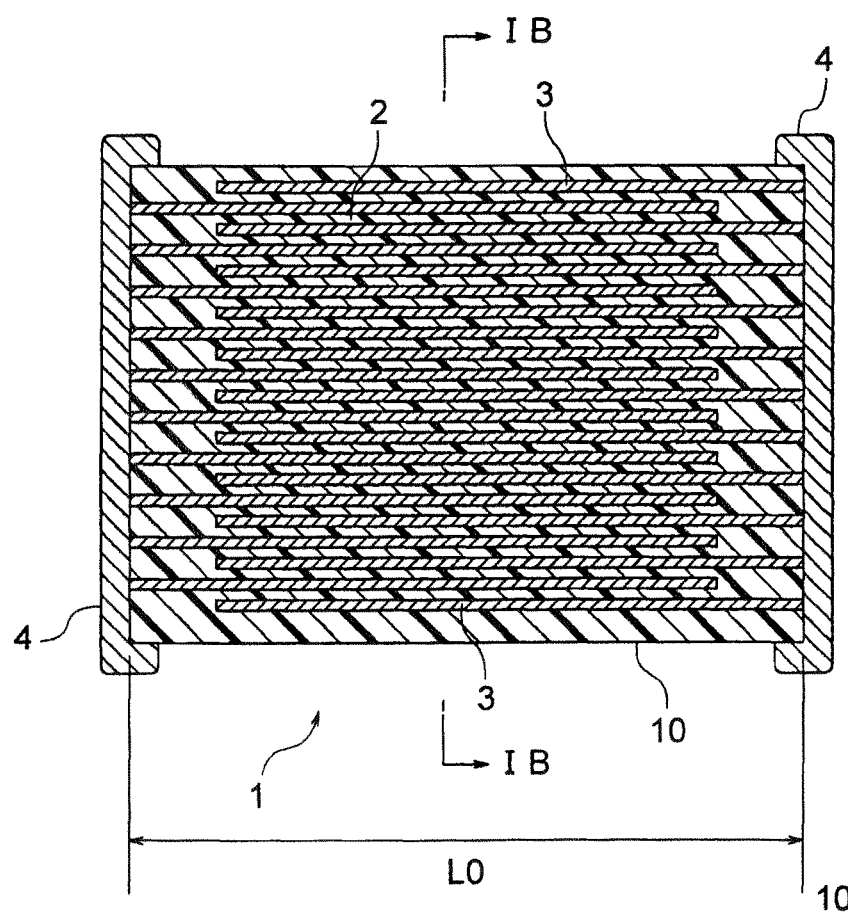
FIG. 1A is a cross-sectional view of a multilayer ceramic capacitor.
Figure 1A:
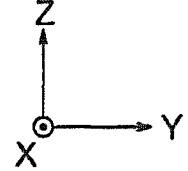
Figure 1B:
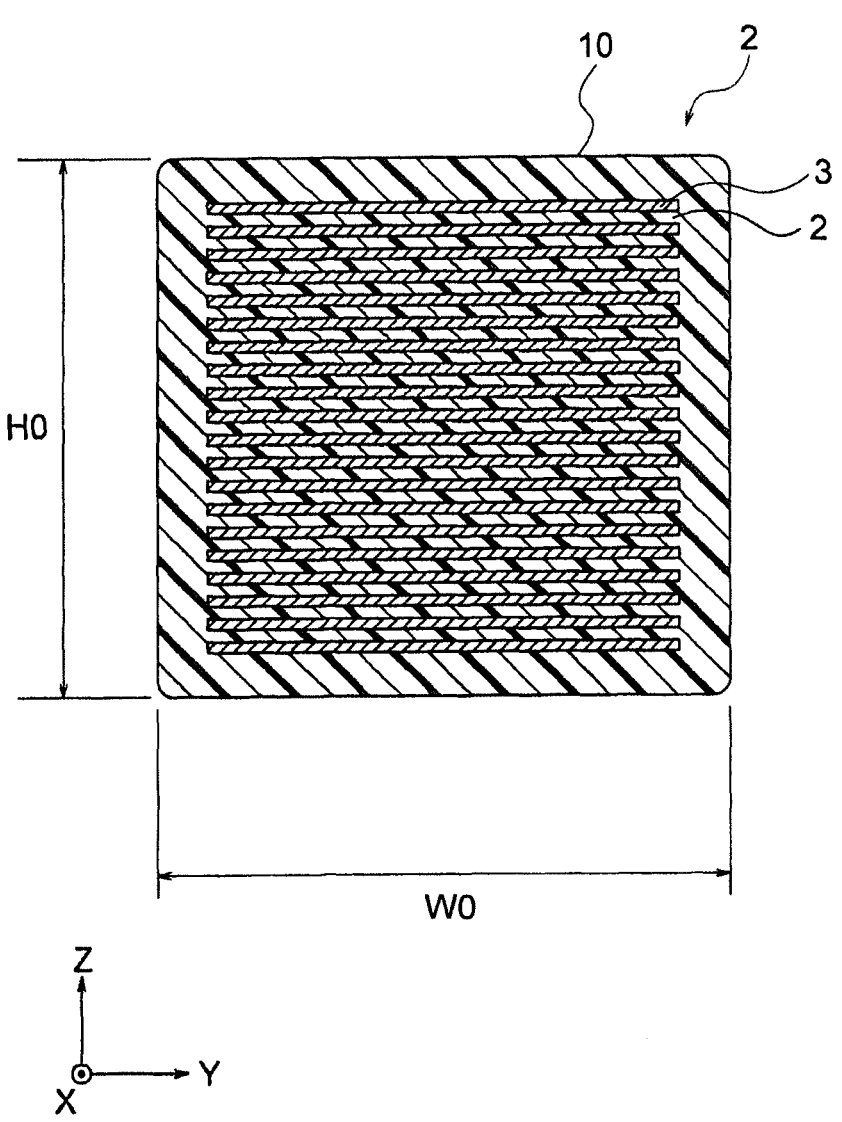
FIG. 1B is a cross-sectional view of the multilayer ceramic capacitor along the IB-IB line of FIG. 1A.

A multilayer ceramic capacitor 1 as a multilayer electronic device according to the present embodiment is shown in FIG. 1A and FIG. 1B. The multilayer ceramic capacitor 1 includes an element body 10 having a structure in which dielectric layers 2 and internal electrode layers 3 are laminated alternately. A pair of external electrodes 4 conducting with the internal electrode layers 3 alternately arranged inside the element body 10 is formed at both ends of the element body 10. The element body 10 has any shape, but normally has a rectangular parallelepiped shape. The element main body 10 has any appropriate size based on usage.

In the present embodiment, the element body 10 may have a vertical dimension LO of 5.7-0.4 mm (see FIG. 1A), a width dimension W0 of 5.0-0.2 mm (see FIG. 1B), and a height dimension H0 of 5.0-0.2 mm (see FIG. 1B).

As a specific size of the element body 10, LO×WO is (5.7±0.4) mm×(5.0±0.4) mm, (4.5±0.4) mm×(3.2±0.4) mm, (3.2±0.3) mm×(2.5±0.2) mm, (3.2±0.3) m×(1.6±0.2) mm, (2.0±0.2) mm×(1.2±0.1) mm, (1.6±0.2) mm×(0.8±0.1) mm, (1.0±0.1) mm×(0.5±0.05) mm, (0.6±0.06) mm×(0.3±0.03) mm, (0.4±0.04) m×(0.2±0.02) mm, or the like. H0 is not limited and is, for example, about the same as or less than W0.

1.2 Dielectric Layers

The dielectric layers 2 are compose of a dielectric composition according to the present embodiment mentioned below.

The thickness of the dielectric layers 2 per layer (interlayer thickness) is not limited and can freely be determined based on desired characteristics, applications, and the like. The interlayer thickness may normally be 20 μm or less, 10 μm or less, or 5 μm or less. In the present embodiment, the lamination number of dielectric layers 2 is not limited and may be, for example, 10 or more, 100 or more, or 200 or more.

1.3 Internal Electrode Layers

In the present embodiment, the internal electrode layers 3 are laminated so that their ends are alternately exposed on two end surfaces of the element body 10 facing each other.

The internal electrode layers 3 contain any conductive material. Examples of the noble metal used as the conductive material include Pd, Pt, and Ag—Pd alloys. Examples of the base metal used as the conductive material include Ni, Ni based alloys, Cu, and Cu based alloys. The Ni, Ni based alloys, Cu, or Cu based alloys may contain various trace components, such as P and/or S, in an amount of about 0.1 mass % or less. The internal electrode layers 3 may be formed using a commercially available electrode paste. The thickness of the internal electrode layers 3 may be determined appropriately based on usage or so.

1.4 External Electrodes

The external electrodes 4 contain any known conductive material, such as Ni, Cu, Sn, Ag, Pd, Pt, Au, alloys thereof, and conductive resins. The thickness of the external electrodes 4 may be determined appropriately based on usage or so.

<2. Dielectric Composition>

Figure 2:
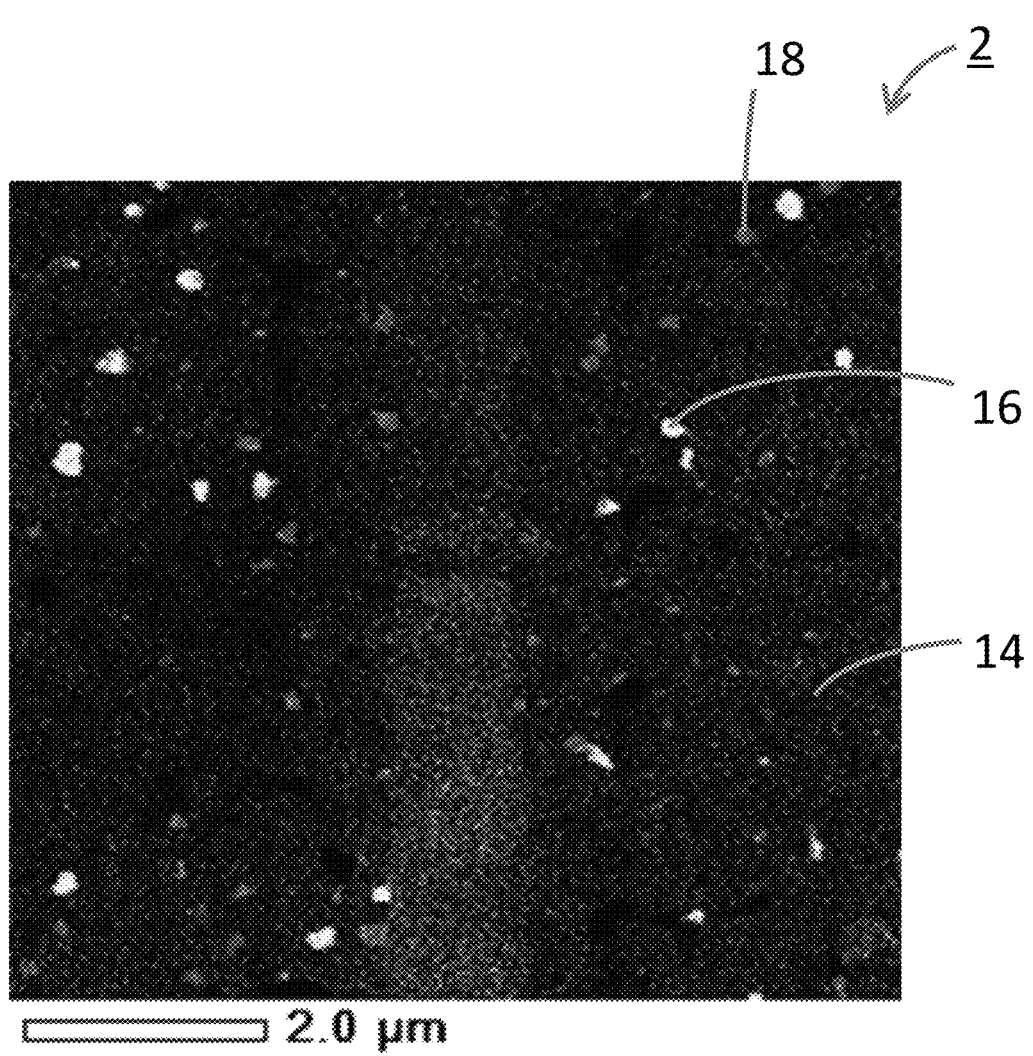
FIG. 2 is a mapping image of Sample No. 3.
Figure 3:
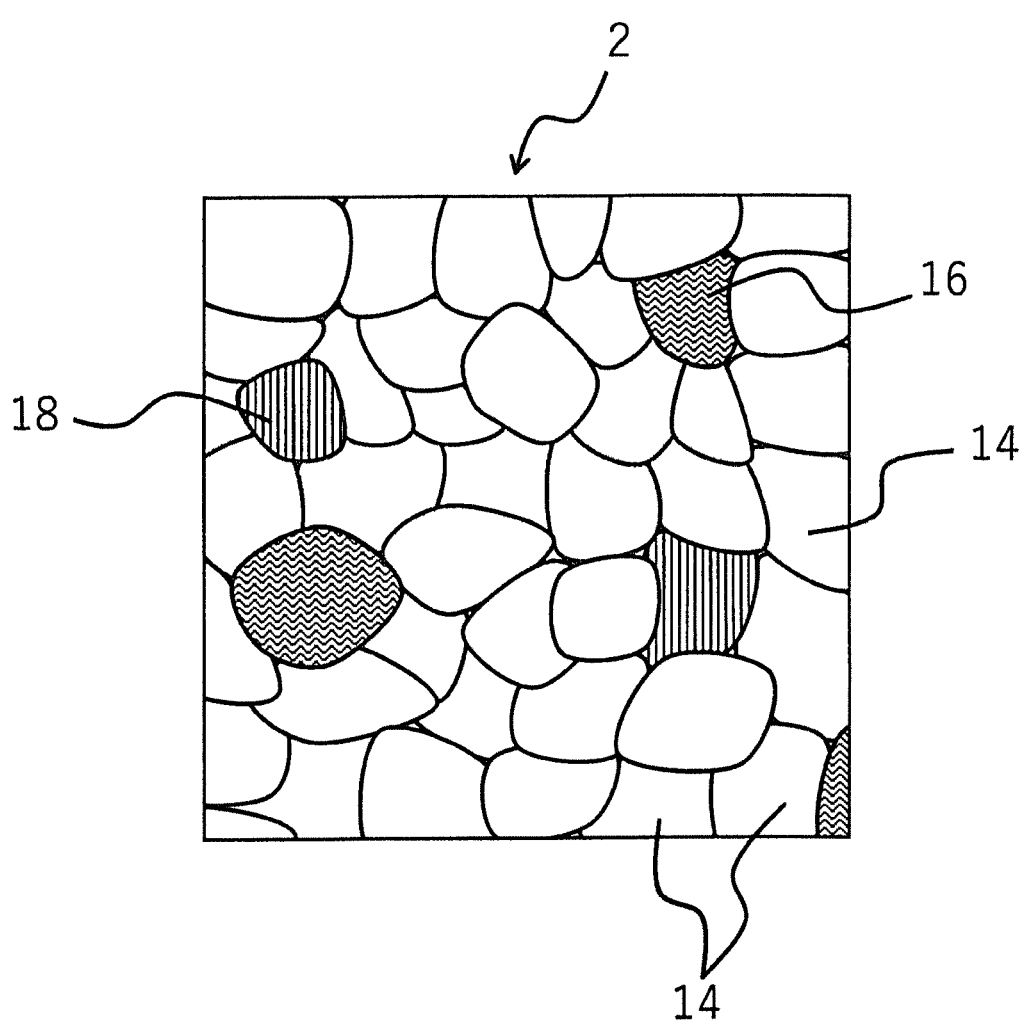
FIG. 3 is a schematic view of a cross section of a dielectric composition.

FIG. 2 is a mapping image made by using STEM-EDS for a dielectric composition constituting the dielectric layers 2 according to the present embodiment, and FIG. 3 is a schematic view of the dielectric composition constituting the dielectric layers 2 according to the present embodiment. As shown in FIG. 2 and FIG. 3, the dielectric composition constituting the dielectric layers 2 according to the present embodiment includes first segregation phases 16 and second segregation phases 18 between main phases 14. The dielectric composition may be a dielectric ceramic composition.

2.1 Main Phases

The main phases 14 of the present embodiment contain a compound having a perovskite crystal structure represented by $ABO_3$ as a main component. The main component of the main phases 14 is a component that occupies 80-100 parts by mass (preferably, 90-100 parts by mass) with respect to 100 parts by mass of the main phases.

"A" is one or more selected from barium (Ba), strontium (Sr), and calcium (Ca). "A" may be one or more selected from Ba and Sr. Ba may be contained at 80 mol % or more with respect to "A" or may be contained at 90 mol % or more with respect to "A". "A" may be only Ba.

"B" is one or more selected from titanium (Ti), zirconium (Zr), and hafnium (Hf). "B" may be one or more selected from Ti and Zr. Ti may be contained at 70 mol % or more with respect to "B" or may be contained at 80 mol % or more with respect to "B". "B" may be only Ti.

Assuming that "A" is one or more selected from Ba, Sr, and Ca, and that "B" is one or more selected from Ti and Zr, the composition of the main component is specifically described as $\{\{Ba_{1-x-y}Ca_xSr_y\}O\}_u(Ti_{1-z}Zr_z)_vO_2$.

"x" is preferably $0 \leq x < 0.10$, and more preferably $0 \leq x \leq 0.05$. "y" is preferably $0 \leq y < 0.10$, and more preferably $0 < y < 0.05$. "z" is preferably $0 < z < 0.30$, and more preferably $0 \leq z \leq 0.15$. u/v is preferably $0.997 \leq u/v \leq 1.010$, and more preferably $0.998 \leq u/v \leq 1.005$.

In the present embodiment, the dielectric composition may include one or more selected from magnesium (Mg), manganese (Mn), vanadium (V), and chromium (Cr) as M. In addition, the dielectric composition includes RE (one or more selected from rare earth elements) and silicon (Si). M tends to be contained in the main phases 14 of the dielectric composition. M is mainly contained in the dielectric composition as an oxide of M.

The RE content may be 0.90 mol % or more and 3.60 mol % or less in terms of $RE_2O_3$ with respect to the main component. The M content may be 0.10 mol % or more and 2.00 mol % or less or may be 0.20 mol % or more and 1.00 mol % or less, in terms of MO. The Si content may be 0.50 mol % or more and 1.90 mol % or less or may be 0.60 mol % or more and 1.80 mol % or less, in terms of $SiO_2$. When each element content is within the above-mentioned range, the reliability of the multilayer ceramic capacitor including the dielectric composition is improved, and the high-temperature load life is easily improved.

There is no limit on the type of RE. For example, RE may be one or more selected from dysprosium (Dy), gadolinium (Gd), yttrium (Y), and ytterbium (Yb). The smaller the ionic radius of RE is, the more difficult it is to proceed with a solid solution of RE into the main component. As a result, the relative permittivity tends to decrease, and the specific resistance tends to decrease.

2.2 Segregation Phases (First Segregation Phases and Second Segregation Phases)

The first segregation phases 16 include RE, A, Si, Ti, and oxygen (O). The second segregation phases 18 include RE, A, Ti, and O and do not substantially include Si.

The total amount of RE, A, Si, and Ti with respect to the total amount of elements other than O in the first segregation phases 16 may be 90 atomic % or more. The total amount of RE, A, and Ti with respect to the total amount of elements other than O in the second segregation phases 18 may be 90 atomic % or more.

The cross sections perpendicular to the lamination direction of the multilayer ceramic capacitor 1 include a cross section of the dielectric composition constituting the dielectric layers 2. In the cross section of the dielectric composition, $0.10 < S2/S1 \leq 1.50$ is satisfied, where S1 is an area ratio of the first segregation phases 16, and S2 is an area ratio of the second segregation phases 18.

Since the first segregation phases 16 and the second segregation phases 18 are segregated so as to satisfy $0.10 < S2/S1 \leq 1.50$, the components contained in the first segregation phases promote the densification of the dielectric composition and the solid solution of RE into the main phases. Thus, the density of the dielectric composition becomes high, and the relative permittivity and the specific resistance of the dielectric composition also become high. In addition, the components contained in the second segregation phases have the effect of preventing grain growth. The effect of preventing grain growth secures a sufficient number of grain boundaries. Thus, the high-temperature load life of the dielectric composition is extended.

Hereinafter, a method of calculating S2/S1 in the dielectric composition is explained.

First, a mapping analysis is performed on measurement points of the cross section of the dielectric composition using a scanning transmission electron microscope (STEM) equipped with an energy dispersive X-ray analyzer (EDS). Hereinafter, the STEM equipped with the EDS is referred to as a STEM-EDS. The size of the measurement range is not limited. For example, the measurement range is determined so that the dielectric composition has an area of 50 $\mu m^2$ or more. The obtained mapping image is divided into dots of 0.02 $\mu$m/pixel or more and 0.05 $\mu$m/pixel or less, and the contrast intensity of each element at each dot is quantified. Specifically, the contrast intensity is classified into 91 stages from 0 to 90 with the lowest contrast intensity (no detection) of 0 and the highest contrast intensity of 90. A dot with a contrast intensity of 75 or more for rare earth elements is considered to be a dot with segregated rare earth elements. Then, a portion where the dots with segregated rare earth elements are gathered is considered to be a segregation phase. Each segregation phase has an area of at least 0.005 $\mu m^2$. A phase smaller than 0.005 $\mu m^2$ is not considered to be the segregation phase.

Among the segregation phases, the segregation phase having a Si content of less than 1.0 atomic % is defined as a second segregation phase, and the segregation phase having 1.0 atomic % or more is defined as a first segregation phase. That is, the fact that the segregation phase does not substantially include Si means that the content ratio of Si in the segregation phase is less than 1.0 atomic %. The content ratio of RE, A, Ti, and O in each segregation phase is not limited, and it is sufficient if it can be confirmed by using STEM-EDS that RE, A, Ti, and O are contained. Then, as shown in FIG. 2, prepared is a mapping image where the first segregation phases and the second segregation phases can be distinguished by changing the color. Then, S2/S1 is calculated by calculating an area ratio S1 of the first segregation phases and an area ratio S2 of the second segregation phases from the mapping image.

0<A2/A1<1.00 may be satisfied, where A1 is an average circle equivalent diameter of the first segregation phases 16, and A2 is an average circle equivalent diameter of the second segregation phases 18. 0.14<A2/A1<0.88 may be satisfied. When A2/A1 is less than 1.00, the reliability of the multilayer ceramic capacitor including the dielectric composition is improved, and the high-temperature load life is easily improved. This is because the second segregation phases, the regions containing a large amount of Ti, sufficiently become small, and the generation of oxygen defects due to the change in the valence of Ti is thereby prevented.

The circle equivalent diameters of all segregation phases included in the mapping image are measured to calculate an average circle equivalent diameter A1 of the first segregation phases and an average circle equivalent diameter A2 of the second segregation phase. Then, A2/A1 is calculated.

The atomic ratio of Ba to Ti in the first segregation phases may be more than 1.00 or may be 1.42 or more. The atomic ratio of Ba to Ti in the second segregation phases may be less than 1.00 or may be 0.57 or less. Hereinafter, the atomic ratio of Ba to Ti may be referred to as Ba/Ti. When Ba/Ti in the first segregation phases and Ba/Ti in the second segregation phases are within the above ranges, it is possible to prevent the generation of oxygen defects due to the change in the valence of Ti in the segregation phases. Thus, the reliability of the multilayer ceramic capacitor including the dielectric composition is improved, and the high-temperature load life is easily improved.

A method of calculating Ba/Ti in the first segregated phases is explained. In principle, Ba/Ti is calculated for all dots included in the first segregation phases included in the above-mentioned mapping image, and Ba/Ti of the first segregation phases is calculated on average. However, the compositions of the first segregation phases included in the above-mentioned mapping image may be considered uniform. That is, a value obtained by calculating Ba/Ti for any one dot included in each of the first segregation phases may be used as Ba/Ti for all dots included in each of the first segregation phases. Moreover, a value obtained by calculating and averaging Ba/Ti for any two or more dots included in each of the first segregation phases may be used as Ba/Ti for all dots included in each of the first segregation phases. Ba/Ti of the second segregation phases is calculated similarly.

The ratio of the total area of the segregation phases to the entire dielectric composition is not limited and may be, for example, 0.5% or more and 3.0% or less. If the total area ratio of the segregation phases is too small, non-uniform abnormal grain growth occurs due to the lack of grain boundary components. Thus, the reliability of the dielectric composition tends to decrease. If the total area ratio of the segregation phase is too large, the area ratio of the main phases is relatively reduced, and the content ratio of the main phase component is relatively reduced. The dielectric property of the dielectric composition is particularly exhibited by the main phase component. Thus, if the total area ratio of the segregation phases is too large, it is difficult to sufficiently secure the dielectric property of the dielectric composition, and the relative permittivity of the dielectric composition tends to decrease.

<3. Method of Manufacturing Multilayer Ceramic Capacitor>

Next, a method of manufacturing a multilayer ceramic capacitor 1 shown in FIG. 1 is explained below.

As with conventional multilayer ceramic capacitors, the multilayer ceramic capacitor 1 of the present embodiment is manufactured by producing a green chip with a normal printing method or sheet method using a paste, firing this green chip, printing or transferring external electrodes, and firing them. Hereinafter, a method of manufacturing the multilayer ceramic capacitor 1 is specifically explained.

First, dielectric raw materials for forming dielectric layers are prepared and turned into a dielectric-layer paint.

As the dielectric raw materials, a raw material of $ABO_3$ (main component) and raw materials of various other oxides are prepared. As these raw materials, oxides of the above-mentioned components, mixtures thereof, and composite oxides can be used, and various compounds to be the above-mentioned oxides, composite oxides, or the like by firing, such as carbonates, oxalates, nitrates, hydroxides, and organometallic compounds, are appropriately selected and can be used by mixing them. In the present embodiment, it is preferable to use a mixture in which the oxides of the above-mentioned components are uniformly dispersed with respect to the main component, but a dielectric raw material in which the main component is coated with the above-mentioned components may be used.

The raw material of $ABO_3$ (main component) can be manufactured by various methods, such as various liquid-phase methods (e.g., oxalate method, hydrothermal synthesis method, alkoxide method, sol-gel method) in addition to the so-called solid-phase methods.

When the dielectric layers include components other than the above-mentioned components, oxides of those components, mixtures thereof, or composite oxides can be used as raw materials for the components. In addition, various compounds to be the above-mentioned oxides or composite oxides by firing can be used.

Each compound content in the dielectric raw materials is determined so as to have the composition of the above-mentioned dielectric composition after firing.

The dielectric-layer paste may be an organic based paint obtained by kneading the dielectric raw materials and an organic vehicle or may be a water based paint.

The organic vehicle is a binder dissolved in an organic solvent. Known binders and solvents are used.

When the dielectric-layer paste is a water based paint, the dielectric raw materials and a water based vehicle in which a water-soluble binder, a dispersant, and the like are dissolved in water are kneaded. The water-soluble binder is not limited and is, for example, polyvinyl alcohol, cellulose, a water-soluble acrylic resin, or the like.

An internal-electrode-layer paste is prepared by kneading the above-mentioned organic vehicle and a conductive material made of Ni or Ni alloy mentioned above or various oxides, organic metal compounds, resinates, etc. to be Ni or Ni alloy mentioned above after firing. The internal-electrode-layer paste may include an inhibitor. The inhibitor is not limited and may have a composition similar to that of the main component.

An external-electrode paste is prepared similarly to the above-mentioned internal-electrode-layer paste.

The amount of the organic vehicle in each of the above-mentioned pastes is not limited and is a normal amount, such as about 1-15% by mass for the binder and about 10-60% by mass for the solvent. If necessary, each paste may include an additive selected from various dispersants, plasticizers, dielectrics, insulators, and the like. The total amount of them may be 10% by mass or less.

When a printing method is used, the dielectric-layer paste and the internal-electrode-layer paste are printed on a substrate, such as PET, laminated, cut into a predetermined shape, and thereafter peeled off from the substrate to obtain a green chip.

When a sheet method is used, green sheets are formed using the dielectric-layer paste, the internal-electrode-layer paste is printed on the green sheets, and these are laminated and cut into a predetermined shape to obtain a green chip.

Before firing, the green chip is subjected to a binder removal treatment. As the binder removal conditions, the heating rate is preferably 5-300° C./hour, the binder removal temperature is preferably 180-900° C., and the holding time is preferably 0.5-48 hours. The atmosphere for the binder removal treatment is the air or a reducing atmosphere (e.g., a humidified $N_2$ +$H_2$ mixed gas atmosphere).

After the binder removal, the green chip is fired. For example, the heating rate may be 200-20000° C./h, the firing temperature may be 1150-1350° C., and the holding time may be 0.1-10 hours.

The firing proceeds more as the heating rate is lower, the firing temperature is higher, and the holding time is longer. As the firing proceeds, the ratio of the second segregation phases tends to decrease, and the ratio of the first segregation phases tends to increase. That is, S2/S1 tends to decrease. As the firing proceeds, the average circle equivalent diameter of the first segregation phases tends to increase as compared with the average circle equivalent diameter of the second segregation phases. That is, A2/A1 tends to decrease. As the Si content in the dielectric-layer paste becomes higher, the content ratio of the second segregation phases becomes lower, and the firing proceeds more easily. The lower the Si content in the dielectric-layer paste is, the lower the content ratio of the first segregation phases is, and the more difficult it is for firing to proceed.

When the firing temperature is low, it is difficult to form the first segregation phases. As a result, it is difficult for the dielectric density to be high. In addition, grain growth of the main phases is hard to occur. As a result, the relative permittivity tends to be low. In addition, the solid solution of various components into the main phases is hard to proceed, and the specific resistance and the high-temperature load life are likely to decrease. When the firing temperature is high, the first segregation phases are formed, but the second segregation phases are less likely to be formed. In addition, abnormal grain growth of the main phases tends to occur, and the relative permittivity tends to be high. In addition, the solid solution of each main component into the main phases also proceeds, and the specific resistance thereby tends to be high. However, there tends to be variation in the size of the main phases, and the high-temperature load life tends to be low.

The atmosphere during firing is not limited and may be the air or a reducing atmosphere. The oxygen partial pressure may be $1.0 \times 10^{-14}$ to $1.0 \times 10^{-9}$ MPa.

The fine structure of the dielectric composition after firing also changes depending on the composition of the dielectric composition, particularly the content ratio of the above-mentioned various oxides.

The higher the Si content is, the higher the ratio of the first segregation phases tends to be higher, and the lower S2/S1 tends to be. In addition, the dielectric density tends to increase. In addition, the firing temperature for optimizing S2/S1 becomes lower.

The lower the Si content is, the lower the ratio of the first segregation phases tends to be, and the higher S2/S1 tends to be. In addition, the dielectric density tends to decrease. In addition, the firing temperature for optimizing S2/S1 becomes higher.

When the RE content is high, RE and Si react sufficiently. Thus, the ratio of the first segregation phases having a high Si content ratio tends to increase, and S2/S1 tends to decrease. When the Si content is high, the ratio of segregation phases becomes large, and the relative permittivity thereby tends to decrease. In addition, the high-temperature load life tends to decrease as the amount of RE not included in the main phases or the segregation phases increases.

When the RE content is small, the amount of RE for reacting with Si decreases, and the reactants of RE and Si decrease. Thus, the ratio of the first segregation phases tends to decrease, and S2/S1 tends to increase. The reactants of RE and Si promote the densification of the dielectric composition. Thus, when the RE content is small, the dielectric density tends to decrease. When the RE content is small, the solid solution of RE into the main phases is small, and the specific resistance and the high-temperature load life tend to decrease.

When the ionic radius of RE is small, it is difficult to sufficiently proceed with the solid solution of RE into the main phases. RE not solid-soluted into the main phases tends to remain as a grain boundary component. Thus, when the ionic radius of RE is small, the grain growth of the main phases is reduced, and the particle sizes of the main phases are reduced. Then, the relative permittivity of the dielectric composition tends to decrease. In addition, it is difficult to sufficiently proceed with the solid solution of RE into the main phases, and the specific resistance and high-temperature load life of the dielectric composition thereby tend to decrease. When the ionic radius of RE is large, the solid solution of RE into the main phases is easily generated. The grain growth of the main phases via the reaction between the grain boundary component and the main phases, such as the solid solution of RE into the main phases, is promoted, and the particle sizes of the main phases are increased. Thus, the relative permittivity of the dielectric composition tends to increase. Thus, the solid solution of RE into the main phases is promoted by the increase in the ionic radius of RE, and the specific resistance and the high-temperature load life of the dielectric composition are thereby easily increased.

The formation of each segregation phase is not very affected even if the M content is changed, but the solid solution of M into the main phase proceeds, and M acts as an acceptor component. Thus, when the amount of M is large, the high-temperature load life of the dielectric composition tends to easily decrease. When the amount of M is small, the specific resistance tends to easily decrease.

The atmosphere during firing is preferably a reducing atmosphere. As the atmosphere gas, for example, a humidified mixed gas of $N_2$ and $H_2$ can be used.

The oxygen partial pressure during firing is appropriately determined based on the type of the conductive material in the internal-electrode-layer paste, but when a base metal, such as Ni and Ni alloy, is used as the conductive material, the oxygen partial pressure of the atmosphere may be $1.0 \times 10^{-14}$ to $1.0 \times 10^{-9}$ MPa.

In the present embodiment, the element body after firing is preferably subjected to an annealing treatment (an oxidation treatment of the dielectric layers). Specifically, the annealing temperature may be 950-1100° C. The holding time may be 0.1-20 hours. The atmosphere during the oxidation treatment may be a humidified $N_2$ gas (oxygen partial pressure: $1.0 \times 10^{-9}$ to $1.0 \times 10^{-6}$ MPa).

When the $N_2$ gas, the mixed gas, or the like is humidified in the above-mentioned binder removal treatment, firing, and annealing treatment, for example, a wetter is used. In this case, the water temperature is preferably about 5-75° C.

The binder removal treatment, the firing, and the annealing treatment may be performed continuously or independently.

The capacitor element body obtained as mentioned above is subjected to an end-surface polishing by barrel polishing, sandblasting, or the like, and an external-electrode paste is applied and fired to form the external electrodes 4. Then, if necessary, coating layers are formed on the surfaces of the external electrodes 4 by plating or the like.

The multilayer ceramic capacitor of the present embodiment manufactured in such a manner is mounted on, for example, a printed circuit board by soldering or the like and is used for, for example, various electronic devices.

The present invention is not limited to the above-mentioned embodiment and can variously be modified within the scope of the present invention.

In the above-mentioned embodiment, the fine structure is controlled by particularly controlling the composition and the firing conditions. In the present invention, however, the fine structure may be controlled by, for example, a method of preparing and mixing a calcined powder constituting the first segregation phases and the second segregation phases.

MODIFIED EXAMPLES

In the above-mentioned embodiment, the electronic device according to the present invention is a multilayer ceramic capacitor, but is not limited to the multilayer ceramic capacitor and may be an electronic device including the above-mentioned dielectric composition.

For example, the electronic device according to the present invention may be a single-plate ceramic capacitor in which a pair of electrodes is formed on the above-mentioned dielectric composition.

Hereinbefore, an embodiment of the present invention is explained, but the present invention is not limited to the above-mentioned embodiment and may be modified in various embodiments within the scope of the present invention.

The electronic device and the multilayer electronic device including the dielectric composition according to the present invention have a relative permittivity within a range favorably used for automobiles and are particularly favorably used for automobiles because of their high dielectric density, specific resistance, and high-temperature load life.

The higher the relative permittivity is, the higher the characteristics as a dielectric are. In a dielectric composition having a high relative permittivity, however, the amount of decrease in the relative permittivity due to voltage application is large. Thus, a capacitor using a dielectric composition having an excessively high relative permittivity has a low effective capacitance. Thus, the dielectric composition included in the capacitor for automobiles is not favorably used if the relative permittivity is too high or too low.

EXAMPLES

Hereinafter, the present invention is explained in more detail with Examples and Comparative Examples. However, the present invention is not limited to Examples below.

(Preparation of Dielectric Paste)

First, as raw material powders, a $BaTiO_3$ powder (Ba/Ti=1.004), a $RE_2O_3$ powder, a $SiO_2$ powder, a MgO powder, and a $MnCO_3$ powder were prepared and weighed so that the dielectric composition having the composition of each Example and Comparative Example shown in Tables 1-6 would be obtained. For Mg and Mn contained as M, the atomic ratio was set to Mg: Mn=4:3.

Next, 10 parts by weight of polyvinyl butyral resin, 5 parts by weight of dioctyl phthalate (DOP) as a plasticizer, and 100 parts by weight of alcohol as a solvent were mixed by a bead mill with respect to 100 parts by mass of the total of all the above-mentioned raw material powders and were turned into a dielectric-layer paste.

(Preparation of Internal-Electrode-Layer Paste)

Ni powder, terpineol, ethyl cellulose and benzotriazole were prepared to have a mass ratio of 44.6:52.0:3.0:0.4. Then, these were kneaded with a triple-roll mill and slurried to prepare an internal-electrode-layer paste.

(Preparation of Green Chip)

A green sheet was formed on a PET film using the above-mentioned dielectric-layer paste. The green sheet was adjusted so as to have a thickness of 4.0-5.0 μm after drying. Next, an electrode layer was printed in a predetermined pattern on the green sheet using the internal-electrode-layer paste. Then, the green sheet having the electrode layer was prepared by peeling the green sheet from the PET film. Next, green sheets having the electrode layers were laminated and bonded with pressure to obtain a green laminated body. A green chip was prepared by cutting this green laminated body into a predetermined size.

(Preparation of Element Body)

Next, the obtained green chip was subjected to a binder removal treatment, a firing, and an oxidation treatment to obtain an element body as a sintered body.

As the conditions for the binder removal treatment, the heating rate was 25° C./h, the binder removal temperature was 235° C., the holding time was 8 hours, and the atmosphere was the air.

The firing conditions were as shown in Tables 1-6. The atmosphere was a humidified $N_2+H_2$ mixed gas atmosphere, and the oxygen partial pressure was $1.0 \times 10^{-12}$ MPa or $1.0 \times 10^{-13}$ MPa. In Tables 1-3 and Table 5, the oxygen partial pressure was $1.0 \times 10^{-12}$ MPa. In Table 4 and Table 6, the oxygen partial pressure of $1.0 \times 10^{"-12}$ MPa was defined as "high", and the oxygen partial pressure of $1.0 \times 10^{-13}$ MPa was defined as "low".

As the conditions for the oxidation treatment, each of the heating rate and the cooling rate was 200° C./h, the oxidation treatment temperature was 1050° C., the holding time was 3 hours, the atmosphere was a humidified $N_2$ gas, and the oxygen partial pressure was $1.0 \times 10^{-'}$ MPa.

A wetter was used to humidify the atmospheres of the firing and oxidation treatment.

(Preparation of Multilayer Ceramic Capacitor Sample)

Next, the end surfaces of the obtained element body were polished by sandblasting, and Cu was applied as external electrodes to obtain a sample of the multilayer ceramic capacitor shown in FIG. 1. The size of the obtained capacitor sample was 3.2 m×1.6 m×0.7 mm, the thickness of each dielectric layer was 3.2-4.2 μm, and the thickness of each internal electrode layer was 0.8-1.2 μm. The number of dielectric layers was 10.

(Confirmation of Segregation Phases)

The obtained multilayer ceramic capacitor sample was cut in a cross section perpendicular to the dielectric layers (a cross section in the lamination direction). STEM-EDS mapping analysis was performed on a part of the obtained cross section where the presence or absence of segregation phases was determined. In a visual field having a size where five or more internal electrode layers were observed, the obtained mapping image was divided into dots of 0.027 μm/pixel, and the contrast intensity of each element at each dot was quantified. Specifically, the contrast intensity was classified into 91 stages from 0 to 90 with the lowest contrast intensity (no detection) of 0 and the highest contrast intensity of 90. A dot having a contrast intensity of 75 or more for rare earth elements was defined as a dot in which rare earth elements were segregated. The portions where the dots with segregated rare earth elements were gathered were defined as segregation phases. Among the segregation phases, the segregation phase having a Si content of less than 1.0 atomic % was defined as a second segregation phase, and the segregation phase having a Si content of 1.0 atomic % or more was defined as a first segregation phase. It was confirmed by STEM-EDS that each segregation phase included RE, A, Ti, and O. Then, as shown in FIG. 2, a mapping image where the first segregation phases and the second segregation phases could be distinguished by changing the color was prepared.

S2/S1 was calculated from an area ratio of the first segregation phases and an area ratio of the second segregation phases included in the obtained mapping image.

Circle equivalent diameters of the segregation phases included in the obtained mapping image were measured. Then, A2/A1 was calculated by calculating an average circle equivalent diameter A1 of the first segregation phases and an average circle equivalent diameter A2 of the second segregation phases.

Ba/Ti of the first segregation phases and Ba/Ti of the second segregation phases were calculated in the above-mentioned manner. The results are shown in Tables 1-6.

(Measurement of Ceramic Characteristics)

A relative permittivity of the multilayer ceramic capacitor sample was measured using a digital LCR meter (4274A manufactured by YHP). Specifically, a capacitance was measured with reference temperature: 25° C., frequency: 1 kHz, and input signal level (measurement voltage): 1.0 Vrms, and the relative permittivity was calculated from the capacitance. A relative permittivity of 2000 or more and 3000 or less was considered to be good, and a relative permittivity of 2200 or more and 2800 or less was considered to be particularly good.

A specific resistance of the multilayer ceramic capacitor sample was measured using an insulation resistance tester (R8340A manufactured by Advantest). Specifically, an insulation resistance was measured when the multilayer ceramic capacitor was applied with a DC voltage of 20 V/μm for 10 seconds and left for 50 seconds at a temperature of 125° C. The specific resistance was measured from the measured insulation resistance, the electrode area, and the interlayer thickness. A specific resistance of $1.0 \times 10^9$ Ω·m or more was considered to be good, and a specific resistance of $1.0 \times 10^{10}$ Ω·m or more was considered to be particularly good.

A high-temperature load life of the multilayer ceramic capacitor sample was evaluated by measuring a life time while holding a state where a DC voltage of 40 V/μm was being applied at 190° C. In the present examples, the life time was a time from the start of application until the insulation resistance dropped by an order of magnitude. In the present examples, the above-mentioned evaluation was performed on 20 capacitor samples, and a mean time to failure (MTTF) was calculated from the life time of each capacitor sample. The high-temperature load life was considered to be good with a MTTF of 2.0 hours or more, the high-temperature load life was considered to be particularly good with a MTTF of 5.0 hours or more.

As a dielectric density, a density of a disk-shaped dielectric prepared by using the above-mentioned dielectric-layer paste was measured. The conditions for the binder removal treatment, the firing, and the oxidation treatment were the same as those for manufacturing the multilayer ceramic capacitor. A diameter and a thickness of the dielectric were obtained by measuring and averaging those at three points. A volume was calculated from the obtained diameter and thickness, and the dielectric density was calculated from the mass and the volume of the dielectric.

The theoretical density of $BaTiO_3$, which was the main component of the present experimental example, was 6.02 g/cm³. In the present experimental example, the case where the dielectric density was 90% or more (5.4 g/cm³ or more) of the theoretical density of the main component was considered to be good, and the case where the dielectric density was 95% or more (5.7 g/cm³ or more) of the theoretical density of the main component was considered to be particularly good.

TABLE 1

| | | | | | | Fine Structure | | |
| | | | | | | First Segregation Phases | Second Segregation Phases | |
| | | Composition | | | | | | |
| Sample No. | RE | RE₂O₃ [mol %] | SiO₂ [mol %] | MO [mol %] | S2/S1 | Ba/Ti [atomic ratio] | Ba/Ti [atomic ratio] | A2/A1 |
|---|---|---|---|---|---|---|---|---|
| 1 X | Dy | 0.30 | 1.20 | 0.70 | 3.82 | 1.52 | 0.48 | 2.79 |
| 2 | Dy | 0.90 | 1.20 | 0.70 | 1.39 | 1.48 | 0.54 | 0.79 |
| 3 | Dy | 2.40 | 1.20 | 0.70 | 0.38 | 1.53 | 0.51 | 0.67 |
| 4 | Dy | 3.60 | 1.20 | 0.70 | 0.27 | 1.49 | 0.45 | 0.42 |
| 5 X | Dy | 5.00 | 1.20 | 0.70 | 0.03 | 1.53 | 0.46 | 0.01 |

TABLE 1-continued

| | | | Characteristics | | | | Firing Conditions | |
| | | | Rela- | | | | | |
| Sample No. | | Dielec- tric Density [g/cm³] | tive Permit- tivity [—] | Specific Resis- tance [Ω · m] | MTTF [h] | Heating Rate [° C./h] | Firing Temper- ature [° C.] | Hold- ing Time [h] |
|---|---|---|---|---|---|---|---|---|
| 1·X· | | 4.9 | 3413 | 4.22E+08 | 0.2 | 600 | 1280 | 2 |
| 2 | | 5.7 | 2755 | 2.83E+10 | 5.0 | 600 | 1280 | 2 |
| 3 | | 5.9 | 2493 | 1.93E+10 | 6.3 | 600 | 1280 | 2 |
| 4 | | 5.7 | 2697 | 7.71E+10 | 5.6 | 600 | 1280 | 2 |
| 5·X· | | 4.8 | 1882 | 3.96E+11 | 0.1 | 600 | 1280 | 2 |

·X·Comparative Example

TABLE 2

| | | | | | | Fine Structure | | |
| | | | | | | First Segregation Phases | Second Segregation Phases | |
| | | Composition | | | | | | |
| Sample No. | RE | RE₂O₃ [mol %] | SiO₂ [mol %] | MO [mol %] | S2/S1 | Ba/Ti [atomic ratio] | Ba/Ti [atomic ratio] | A2/A1 |
|---|---|---|---|---|---|---|---|---|
| 11·X· | Dy | 2.40 | 0.50 | 0.70 | 3.52 | 1.51 | 0.47 | 0.98 |
| 12 | Dy | 2.40 | 0.60 | 0.70 | 1.49 | 1.49 | 0.47 | 0.74 |
| 3 | Dy | 2.40 | 1.20 | 0.70 | 0.38 | 1.53 | 0.51 | 0.67 |
| 13 | Dy | 2.40 | 1.80 | 0.70 | 0.15 | 1.47 | 0.52 | 0.01 |
| 14·X· | Dy | 2.40 | 1.90 | 0.70 | 0.02 | 1.48 | 0.49 | 0.12 |

| | Characteristics | | | | Firing Conditions | | |
| Sample No. | Dielectric Density [g/cm³] | Relative Permittivity [—] | Specific Resistance [Ω · m] | MTTF [h] | Heating Rate [° C./h] | Firing Temperature [° C.] | Holding Time [h] |
|---|---|---|---|---|---|---|---|
| 11·X· | 4.9 | 846 | 9.21E+08 | 0.1 | 600 | 1280 | 2 |
| 12 | 5.4 | 2115 | 5.82E+09 | 2.2 | 600 | 1280 | 2 |
| 3 | 5.9 | 2493 | 1.93E+10 | 6.3 | 600 | 1280 | 2 |
| 13 | 5.9 | 2693 | 4.88E+10 | 5.8 | 600 | 1280 | 2 |
| 14·X· | 5.8 | 2934 | 9.26E+10 | 1.7 | 600 | 1280 | 2 |

·X· Comparative Example

TABLE 3

| | | | | | | Fine Structure | | |
| | | | | | | First Segregation Phases | Second Segregation Phases | |
| | | Composition | | | | | | |
| Sample No. | RE | RE₂O₃ [mol %] | SiO₂ [mol %] | MO [mol %] | S2/S1 | Ba/Ti [atomic ratio] | Ba/Ti [atomic ratio] | A2/A1 |
|---|---|---|---|---|---|---|---|---|
| 21 | Dy | 2.40 | 1.20 | 0.10 | 0.48 | 1.51 | 0.55 | 0.55 |
| 22 | Dy | 2.40 | 1.20 | 0.20 | 0.42 | 1.42 | 0.45 | 0.56 |
| 3 | Dy | 2.40 | 1.20 | 0.70 | 0.38 | 1.53 | 0.51 | 0.67 |
| 23 | Dy | 2.40 | 1.20 | 1.00 | 0.45 | 1.58 | 0.58 | 0.47 |
| 24 | Dy | 2.40 | 1.20 | 2.00 | 0.37 | 1.51 | 0.45 | 0.48 |

| | Characteristics | | | | Firing Conditions | | |
| Sample No. | Dielectric Density [g/cm³] | Relative Permittivity [—] | Specific Resistance [Ω · m] | MTTF [h] | Heating Rate [° C./h] | Firing Temperature [° C.] | Holding Time [h] |
|---|---|---|---|---|---|---|---|
| 21 | 5.9 | 2734 | 8.53E+09 | 6.1 | 600 | 1280 | 2 |
| 22 | 5.9 | 2669 | 1.89E+10 | 5.7 | 600 | 1280 | 2 |

TABLE 3-continued

| 3  | 5.9 | 2493 | 1.93E+10 | 6.3 | 600 | 1280 | 2 |
|----|-----|------|----------|-----|-----|------|---|
| 23 | 5.9 | 2380 | 4.48E+10 | 5.2 | 600 | 1280 | 2 |
| 24 | 5.9 | 2225 | 8.11E+10 | 3.1 | 600 | 1280 | 2 |

TABLE 4

| | | | | | | Fine Structure | | | |
|---|---|---|---|---|---|---|---|---|---|
| | | | | | | First Segregation Phases | Second Segregation Phases | | Characteristics Dielectric |
| | | Composition | | | | | | | |
| Sample No. | RE | RE$_2$O$_3$ [mol %] | SiO$_2$ [mol %] | MO [mol %] | S2/S1 | Ba/Ti [atomic ratio] | Ba/Ti [atomic ratio] | A2/A1 | Density [g/cm$^3$] |
| 31 X | Dy | 2.40 | 1.20 | 0.70 | 1.63 | 1.52 | 0.51 | 0.99 | 5.2 |
| 32 | Dy | 2.40 | 1.20 | 0.70 | 1.44 | 1.56 | 0.45 | 0.88 | 5.7 |
| 3 | Dy | 2.40 | 1.20 | 0.70 | 0.38 | 1.53 | 0.51 | 0.67 | 5.9 |
| 33 | Dy | 2.40 | 1.20 | 0.70 | 0.16 | 1.48 | 0.42 | 0.14 | 5.9 |
| 34 X | Dy | 2.40 | 1.20 | 0.70 | 0.04 | 1.52 | 0.48 | 0.08 | 5.9 |

| | Characteristics | | | Firing Conditions | | | |
|---|---|---|---|---|---|---|---|
| Sample No. | Relative Permittivity [—] | Specific Resistance [Ω · m] | MTTF [h] | Heating Rate [° C./h] | Firing Temperature [° C.] | Holding Time [h] | Oxygen Partial Pressure |
| 31 X | 1732 | 3.24E+09 | 2.7 | 600 | 1180 | 2 | high |
| 32 | 2231 | 1.03E+10 | 5.4 | 600 | 1220 | 2 | high |
| 3 | 2493 | 1.93E+10 | 6.3 | 600 | 1280 | 2 | high |
| 33 | 2784 | 9.80E+10 | 5.1 | 200 | 1320 | 3 | low |
| 34 X | 9974 | 3.89E+11 | 0.0 | 200 | 1350 | 3 | low |

X Comparative Example

TABLE 5

| | | | | | | Fine Structure | | | |
|---|---|---|---|---|---|---|---|---|---|
| | | | | | | First Segregation Phases | Second Segregation Phases | | |
| | | Composition | | | | | | | |
| Sample No. | RE | RE$_2$O$_3$ [mol %] | SiO$_2$ [mol %] | MO [mol %] | S2/S1 | Ba/Ti [atomic ratio] | Ba/Ti [atomic ratio] | A2/A1 | |
| 41 | Dy | 2.50 | 1.00 | 0.70 | 0.41 | 1.53 | 0.57 | 0.62 | |
| 3 | Dy | 2.40 | 1.20 | 0.70 | 0.38 | 1.53 | 0.51 | 0.67 | |
| 42 | Dy | 2.50 | 1.00 | 0.70 | 0.39 | 1.52 | 0.48 | 0.65 | |
| 43 | Dy | 2.50 | 1.00 | 0.70 | 0.37 | 1.49 | 0.52 | 0.64 | |
| 44 | Dy | 2.50 | 1.00 | 0.70 | 0.40 | 1.51 | 0.49 | 0.59 | |

| | Characteristics | | | | Firing Conditions | | |
|---|---|---|---|---|---|---|---|
| Sample No. | Dielectric Density [g/cm$^3$] | Relative Permittivity [—] | Specific Resistance [Ω · m] | MTTF [h] | Heating Rate [° C./h] | Firing Temperature [° C.] | Holding Time [h] |
| 41 | 5.9 | 2606 | 2.38E+10 | 6.8 | 600 | 1280 | 2 |
| 3 | 5.9 | 2493 | 1.93E+10 | 6.3 | 600 | 1280 | 2 |
| 42 | 5.9 | 2572 | 1.92E+10 | 6.3 | 600 | 1280 | 2 |
| 43 | 5.9 | 2564 | 1.32E+10 | 6.1 | 600 | 1300 | 2 |
| 44 | 5.9 | 2405 | 1.08E+10 | 5.7 | 600 | 1300 | 2 |

TABLE 6

| Sample No. | RE | Composition RE$_2$O$_3$ [mol %] | SiO$_2$ [mol %] | MO [mol %] | S2/S1 | First Segregation Phases Ba/Ti [atomic ratio] | Second Segregation Phases Ba/Ti [atomic ratio] | A2/A1 | Characteristics Dielectric Density [g/cm$^3$] |
|---|---|---|---|---|---|---|---|---|---|
| 51X | Dy | 2.00 | 0.20 | 0.70 | — | — | 0.51 | — | 4.1 |
| 52X | Dy | 2.00 | 0.50 | 0.70 | 2.12 | 1.51 | 0.47 | 1.13 | 4.6 |
| 53 | Dy | 2.00 | 0.50 | 0.70 | 1.48 | 1.54 | 0.53 | 0.58 | 5.4 |
| 54 | Dy | 2.00 | 0.80 | 0.70 | 0.84 | 1.51 | 0.48 | 0.64 | 5.7 |
| 3 | Dy | 2.40 | 1.20 | 0.70 | 0.38 | 1.53 | 0.51 | 0.67 | 5.9 |
| 55 | Dy | 2.60 | 1.50 | 0.70 | 0.25 | 1.48 | 0.49 | 0.71 | 5.9 |
| 56 | Dy | 2.80 | 1.90 | 0.70 | 0.12 | 1.49 | 0.52 | 0.78 | 5.9 |
| 57 | Dy | 2.80 | 1.90 | 0.70 | 0.83 | 1.45 | 0.55 | 0.68 | 5.9 |
| 58 | Dy | 2.00 | 0.50 | 0.70 | 0.48 | 1.44 | 0.43 | 0.27 | 5.9 |
| 33 | Dy | 2.40 | 1.20 | 0.70 | 0.16 | 1.48 | 0.42 | 0.14 | 5.9 |
| 59X | Dy | 2.80 | 1.90 | 0.70 | 0.00 | 1.42 | — | 0 | 5.9 |

| Sample No. | Characteristics Relative Permittivity [—] | Specific Resistance [Ω · m] | MTTF [h] | Firing Conditions Heating Rate [° C./h] | Firing Temperature [° C.] | Holding Time [h] | Oxygen Partial Pressure |
|---|---|---|---|---|---|---|---|
| 51X | 517 | 8.32E+07 | 0.0 | 600 | 1300 | 2 | high |
| 52X | 973 | 5.32E+08 | 1.8 | 600 | 1260 | 2 | high |
| 53 | 2087 | 4.11E+10 | 4.7 | 600 | 1320 | 2 | high |
| 54 | 2208 | 2.84E+10 | 5.7 | 600 | 1300 | 2 | high |
| 3 | 2493 | 1.93E+10 | 6.3 | 600 | 1280 | 2 | high |
| 55 | 2578 | 1.03E+10 | 6.4 | 600 | 1260 | 2 | high |
| 56 | 2772 | 6.81E+09 | 4.5 | 600 | 1240 | 2 | high |
| 57 | 2147 | 1.29E+09 | 2.6 | 600 | 1180 | 2 | high |
| 58 | 2649 | 9.88E+09 | 2.4 | 200 | 1340 | 3 | low |
| 33 | 2784 | 9.80E+10 | 5.1 | 200 | 1320 | 3 | low |
| 59X | 12536 | 2.83E+11 | 0.0 | 200 | 1300 | 3 | low |

X Comparative Example

Table 1 shows the results of changing only the RE$_2$O$_3$ content under the same conditions except for the RE$_2$O$_3$ content. When S2/S1 is more than 0.10 and 1.50 or less, good characteristics are exhibited.

The smaller the RE$_2$O$_3$ content is, the larger S2/S1 is. This is because the smaller the RE$_2$O$_3$ content is, the more difficult it is to form segregation phases, particularly the first segregation phases as compared with the second segregation phases. When S2/S1 is more than 1.50, it is difficult to densify the dielectric composition. As a result, the dielectric density decreases. In addition, the solid solution of RE into the main component is insufficient. As a result, the relative permittivity becomes too high, the specific resistance becomes too low, and the MTTF decreases.

The larger the RE$_2$O$_3$ content is, the smaller S2/S1 is. This is because the larger the RE$_2$O$_3$ content is, the easier it is to form segregation phases, particularly the first segregation phases as compared with the second segregation phases. When S2/S1 is 0.10 or less, the segregation phases, particularly the first segregation phases, become excessive, and the relative permittivity thereby decreases. The dielectric density also decreases. In addition, the number of places where RE exists alone increases, and the MTTF thereby also decreases.

Table 2 shows the results of changing only the SiO$_2$ content under the same conditions except for the SiO$_2$ content. The larger the SiO$_2$ content is, the smaller S2/S1 tends to be. When S2/S1 is more than 0.10 and is 1.50 or less, good characteristics are exhibited. When the SiO$_2$ content is too small and S2/S1 is too large, the Ti—Dy ratio is too high, and it is difficult to densify the dielectric composition. As a result, the dielectric density decreases, the relative permittivity decreases, the specific resistance decreases, and the MTTF decreases. When the SiO$_2$ content is too large and S2/S1 is too small, the Ti—Dy ratio is too low, and it is easy to densify the dielectric composition. As a result, the MTTF decreases.

Table 3 shows the results of changing only the MO content under the same conditions except for the MO content. In all the experimental examples, S2/S1 was more than 0.10 and was 1.50 or less, and good characteristics were exhibited. The larger the MO content was, the lower the relative permittivity tended to be, the higher the specific resistance tended to be, and the lower the MTTF tended to be.

Table 4 shows the results under the same conditions except that the heat treatment conditions were changed. The lower the firing temperature was and the shorter the firing time was, the more difficult it was to form the first segregation phases, and the larger S2/S1 tended to be. When the firing temperature was so low that S2/S1 was more than 1.50, it was difficult to densify the dielectric composition, and the dielectric density decreased. In addition, the grain growth of the main component was insufficient, and relative permittivity was low. In addition, the solid solution of RE into the main component was also insufficient, and both of the specific resistance and the MTTF tended to decrease.

When the firing temperature is high and the firing time is long, the first segregation phases are formed sufficiently, but it is difficult to form the second grain boundary phases, and S2/S1 tends to be small. When the firing temperature is so high that S2/S1 is 0.10 or less, the abnormal grain growth of the main component may occur, and the relative permittivity becomes too large. In addition, the solid solution of RE into the main component proceeds, and the specific resistance thereby becomes high. However, the variation in the particle size of the main component tends to be large, and the MTTF tends to decrease.

Table 5 shows the results of Sample Nos. 41-44 carried out under the same conditions except that the type of RE was changed. Table 5 also shows Sample No. 3 with different $RE_2O_3$ content and $SiO_2$ content. The smaller the ionic radius of RE is, the more difficult it is to proceed with a solid solution of RE into the main component. As a result, grain growth is reduced, the relative permittivity becomes low, and the specific resistance and the MTTF tend to decrease. The magnitude of the ionic radius of RE shown in Table 5 is Gd>Dy>Y>Yb.

Table 6 shows the results when the $SiO_2$ content and the firing conditions were mainly changed. Basically, the larger the $SiO_2$ content is, the easier it is to densify the dielectric at a low firing temperature. Thus, the larger the $SiO_2$ content is, the lower the favorable firing temperature tends to be.

Each Example in which S2/S1 is within a predetermined range exhibits good characteristics. On the other hand, in Sample No. 51 (including no first segregation phases) and Sample No. 52 (S2/S1 was too high), the Ti—Dy ratio is too high, and it is thereby difficult to densify the dielectric composition. As a result, the dielectric density decreases, the relative permittivity decreases, the specific resistance decreases, and the MTTF decreases. In Sample No. 59 (no second segregation phases were generated), the Ti—Dy ratio is too low, and it is easy to densify the dielectric composition. As a result, the relative permittivity becomes too high, and the MTTF decreases.

DESCRIPTION OF THE REFERENCE NUMERICAL

1 . . . multilayer ceramic capacitor
10 . . . element body
2 . . . dielectric layer
14 . . . main phase
16 . . . first segregation phase
18 . . . second segregation phase
3 . . . internal electrode layer
4 . . . external electrode

What is claimed is:

1. A dielectric composition comprising a main phase, first segregation phases, and second segregation phases, wherein
   the main phase includes a main component having a perovskite crystal structure of $ABO_3$ (A is one or more selected from Ba, Sr, and Ca, and B is one or more selected from Ti, Zr, and Hf),
   the first segregation phases include RE (one or more selected from rare earth elements), A, Si, Ti, and O,
   the second segregation phases include RE, A, Ti, and O and do not substantially include Si, and
   $0.10<S2/S1\leq1.50$ is satisfied on a cross section of the dielectric composition having an area of 50 $\mu m^2$ or more, where S1 is an area ratio of the first segregation phases, and S2 is an area ratio of the second segregation phases.

2. The dielectric composition according to claim 1, further comprising M in addition to Si and RE, wherein
   M is one or more selected from Mg, Mn, V, and Cr, and
   an RE content is 0.90 mol % or more and 3.60 mol % or less in terms of $RE_2O_3$, an M content is 0.20 mol % or more and 1.00 mol % or less in terms of MO, and a Si content is 0.60 mol % or more and 1.80 mol % or less in terms of $SiO_2$, with respect to 100 mol % of the main component.

3. The dielectric composition according to claim 1, wherein
   an atomic ratio of Ba to Ti in the first segregation phases is more than 1.00, and
   an atomic ratio of Ba to Ti in the second segregation phases is less than 1.00.

4. The dielectric composition according to claim 1, wherein $0<A2/A1<1.00$ is satisfied on a cross section of the dielectric composition having an area of 50 $\mu m^2$, where A1 is an average circle equivalent diameter of the first segregation phases, and A2 is an average circle equivalent diameter of the second segregation phases.

5. An electronic device comprising the dielectric composition according to claim 1.

6. A multilayer electronic device comprising dielectric layers and electrode layers alternately stacked, wherein the dielectric layers comprise the dielectric composition according to claim 1.

* * * * *